: US010095360B2

United States Patent
Akagi et al.

(10) Patent No.: US 10,095,360 B2
(45) Date of Patent: Oct. 9, 2018

(54) COMMUNICATION DEVICE AND NON-TRANSITORY COMPUTER-READABLE STORAGE MEDIUM STORING PROGRAM FOR CONTROLLING THE COMMUNICATION DEVICE

(71) Applicants: Koji Akagi, Inazawa (JP); Masaaki Wakizaka, Ichinomiya (JP); Shoji Sato, Nagoya (JP); Akikazu Murata, Gifu-ken (JP)

(72) Inventors: Koji Akagi, Inazawa (JP); Masaaki Wakizaka, Ichinomiya (JP); Shoji Sato, Nagoya (JP); Akikazu Murata, Gifu-ken (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 791 days.

(21) Appl. No.: 14/227,174

(22) Filed: Mar. 27, 2014

(65) Prior Publication Data
US 2014/0292359 A1    Oct. 2, 2014

(30) Foreign Application Priority Data

Mar. 29, 2013   (JP) .................................. 2013-072168

(51) Int. Cl.
*G01R 27/08*    (2006.01)
*G06F 3/044*    (2006.01)
*H04W 4/80*    (2018.01)

(52) U.S. Cl.
CPC .............. *G06F 3/044* (2013.01); *H04W 4/80* (2018.02); *G06F 2203/04101* (2013.01)

(58) Field of Classification Search
CPC .............. G06F 3/044; A61B 2562/046; G01N 2291/014
(Continued)

(56) References Cited

U.S. PATENT DOCUMENTS

2004/0210801 A1* 10/2004 Prasad ................. G11C 27/024
714/700
2004/0212431 A1* 10/2004 Butler ................. H03F 3/45632
330/261
(Continued)

FOREIGN PATENT DOCUMENTS

CN     1010436672 A    9/2007
JP     2003280815 A    10/2003
(Continued)

OTHER PUBLICATIONS

Notification of Reason for Refusal dated Jul. 28, 2015 received from the Japanese Patent Office in related application JP 2013-072168 together with English language translation.
(Continued)

*Primary Examiner* — Giovanni Astacio-Oquendo
(74) *Attorney, Agent, or Firm* — Scully, Scott, Murphy & Presser, P.C.

(57) ABSTRACT

A communication device, including: a touch sensor configured to detect a touch or an approach of an input object by detecting a change in capacitance; and a near field communicator configured to perform near field communication with an information processing terminal present in a communication area in which near field communication is possible, the information processing terminal being capable of performing the near field communication, wherein a distance within which the touch or the approach of the input object is detectable by the touch sensor is shorter than a distance within which the near field communication by the near field communicator with the information processing terminal is possible.

11 Claims, 13 Drawing Sheets

(58) Field of Classification Search
USPC ....... 324/705, 633, 300, 334, 655, 658, 675, 324/708
See application file for complete search history.

(56) References Cited

U.S. PATENT DOCUMENTS

| | | |
|---|---|---|
| 2006/0250374 A1 | 11/2006 | Morita |
| 2007/0288670 A1 | 12/2007 | Lee |
| 2009/0153152 A1* | 6/2009 | Maharyta ................ G06F 3/044 324/684 |
| 2010/0207795 A1* | 8/2010 | Waki ................... H03M 1/0658 341/143 |
| 2011/0177780 A1 | 7/2011 | Sato et al. |
| 2011/0275421 A1 | 11/2011 | Wong et al. |
| 2012/0105369 A1 | 5/2012 | Nakamura |
| 2012/0249449 A1 | 10/2012 | Tseng et al. |
| 2013/0038339 A1* | 2/2013 | Peterson ................ G06F 3/044 324/679 |
| 2013/0049768 A1* | 2/2013 | Mei ...................... G06F 3/044 324/629 |
| 2013/0169340 A1* | 7/2013 | Tao ....................... G06F 3/0416 327/336 |
| 2013/0271161 A1* | 10/2013 | Solven .................. G06F 3/044 324/661 |
| 2015/0145524 A1* | 5/2015 | Duncan ................ G01R 31/024 324/538 |
| 2015/0338363 A1* | 11/2015 | Dean, Jr. ................ G01N 27/02 73/170.26 |
| 2016/0026842 A1* | 1/2016 | Withers ............. G01R 27/2605 324/686 |
| 2016/0054370 A1* | 2/2016 | Fomin .................. G01R 31/025 324/509 |
| 2016/0178689 A1* | 6/2016 | Okita ................... G01R 31/024 324/509 |

FOREIGN PATENT DOCUMENTS

| | | |
|---|---|---|
| JP | 2006309333 A | 11/2006 |
| JP | 2007-166538 A | 6/2007 |
| JP | 2011-146991 A | 7/2011 |
| JP | 2012-095180 A | 5/2012 |
| JP | 2012-160207 A | 8/2012 |
| JP | 2012179936 A | 9/2012 |
| JP | 2012185297 A | 9/2012 |

OTHER PUBLICATIONS

Notification of First Office Action dated May 20, 2016 received from the Chinese Patent Office in related application 201410122992.5 together with English language translation.

* cited by examiner

COMMUNICATION DEVICE AND NON-TRANSITORY COMPUTER-READABLE STORAGE MEDIUM STORING PROGRAM FOR CONTROLLING THE COMMUNICATION DEVICE

CROSS REFERENCE TO RELATED APPLICATION

The present application claims priority from Japanese Patent Application No. 2013-072168, which was filed on Mar. 29, 2013, the disclosure of which is herein incorporated by reference in its entirety.

BACKGROUND OF THE INVENTION

Field of the Invention

The present invention relates to a communication device configured to perform near field communication with an information processing terminal and a non-transitory computer-readable storage medium storing a program for controlling an operation of the communication device.

Description of Related Art

There have been conventionally developed communication devices capable of performing near field communication with information processing terminals such as smartphones and tablet personal computers. In the near field communication, transmission and reception of data can be performed by merely bringing the information processing terminal near to the communication device. Some of the communication devices are provided with operation buttons of touch sensor type for detecting a touch or an approach of an input tool such as a finger of a user. (The input tool may be referred to as an input object.) As the operation buttons of touch sensor type, there are known ones for detecting the touch or the approach of the input tool utilizing a change in capacitance, in other words, by detecting a change in capacitance.

SUMMARY OF THE INVENTION

As described above, the near field communication and the operation buttons of touch sensor type utilizing a change in capacitance (hereinafter referred to as "touch sensor of capacitance type" where appropriate) are very useful technical means. Where the technical means are used in communication devices, the utility of the communication devices is enhanced. However, when the information processing terminal is brought near to the communication device for establishing the near field communication, there is a risk that the touch sensor of capacitance type may be erroneously activated or operated.

The present invention has been developed in view of such situations. It is therefore an object of the invention to provide, in a communication device having touch sensors of capacitance type and capable of performing near field communication with an information processing terminal, a technique of preventing the touch sensor of capacitance type from being erroneously activated when an information processing terminal is brought near to the communication device.

The object indicated above may be attained according to one aspect of the invention, which provides a communication device, comprising: a touch sensor configured to detect a touch or an approach of an input object by detecting a change in capacitance; and a near field communicator configured to perform near field communication with an information processing terminal present in a communication area in which near field communication is possible, the information processing terminal being capable of performing the near field communication, wherein a distance within which the touch or the approach of the input object is detectable by the touch sensor is shorter than a distance within which the near field communication by the near field communicator with the information processing terminal is possible.

The object indicated above may be attained according to another aspect of the invention, which provides a communication device, comprising: a touch sensor configured to detect a touch or an approach of an input object by detecting a change in capacitance; and a near field communicator configured to perform near field communication with an information processing terminal present in a communication area in which near field communication is possible, the information processing terminal being capable of performing the near field communication, wherein the touch sensor has a base body covered with a sensor top cover, wherein the near field communicator has an antenna portion covered with a communicator top cover, and wherein a distance between: a position that is the most distant from the touch sensor in a sensor detection area in which the touch or the approach of the input object is detectable by the touch sensor; and the sensor top cover is shorter than a distance between: a position that is the most distant from the near field communicator in the communication area; and the communication top cover.

The object indicated above may be attained according to still another aspect of the invention, which provides a non-transitory computer-readable storage medium in which is stored a program to be executed by a computer of a communication device comprising: a touch sensor configured to detect a touch or an approach of an input object by detecting a change in capacitance; and a near field communicator configured to perform near field communication with an information processing terminal present in a communication area in which near field communication is possible, the information processing terminal being capable of performing the near field communication, the communication device being configured such that a distance within which the touch or the approach of the input object is detectable by the touch sensor is shorter than a distance within which the near field communication by the near field communicator with the information processing terminal is possible, wherein the program permits the computer to function as a controller configured to reduce a sensor detection area in which the touch or the approach of the input object is detectable by the touch sensor, in a situation in which the near field communication by the near field communicator with the information processing terminal is possible.

The object indicated above may be attained according to yet another aspect of the invention, which provides a non-transitory computer-readable storage medium in which is stored a program to be executed by a computer of a communication device comprising: a touch sensor having a base body covered with a sensor top cover and configured to detect a touch or an approach of an input object by detecting a change in capacitance; and a near field communicator having an antenna portion covered with a communicator top cover and configured to perform near field communication with an information processing terminal present in a communication area in which near field communication is possible, the information processing terminal being capable of performing the near field communication, the communication device being configured such that a distance between: a position that is the most distant from the touch sensor in a sensor detection area in which the touch or the approach of the input object is detectable by the touch sensor; and the sensor top cover is shorter than a distance between: a position that is the most distant from the near field communicator in the communication area; and the communication top cover, wherein the program permits the computer to function as a controller configured to reduce the sensor detection area in a situation in which the near field communication by the near field communicator with the information processing terminal is possible.

BRIEF DESCRIPTION OF THE DRAWINGS

The above and other objects, features, advantages and technical and industrial significance of the present invention will be better understood by reading the following detailed description of embodiments of the invention, when considered in connection with the accompanying drawings, in which.

DETAILED DESCRIPTION OF THE EMBODIMENTS

First Embodiment

Figure 1:
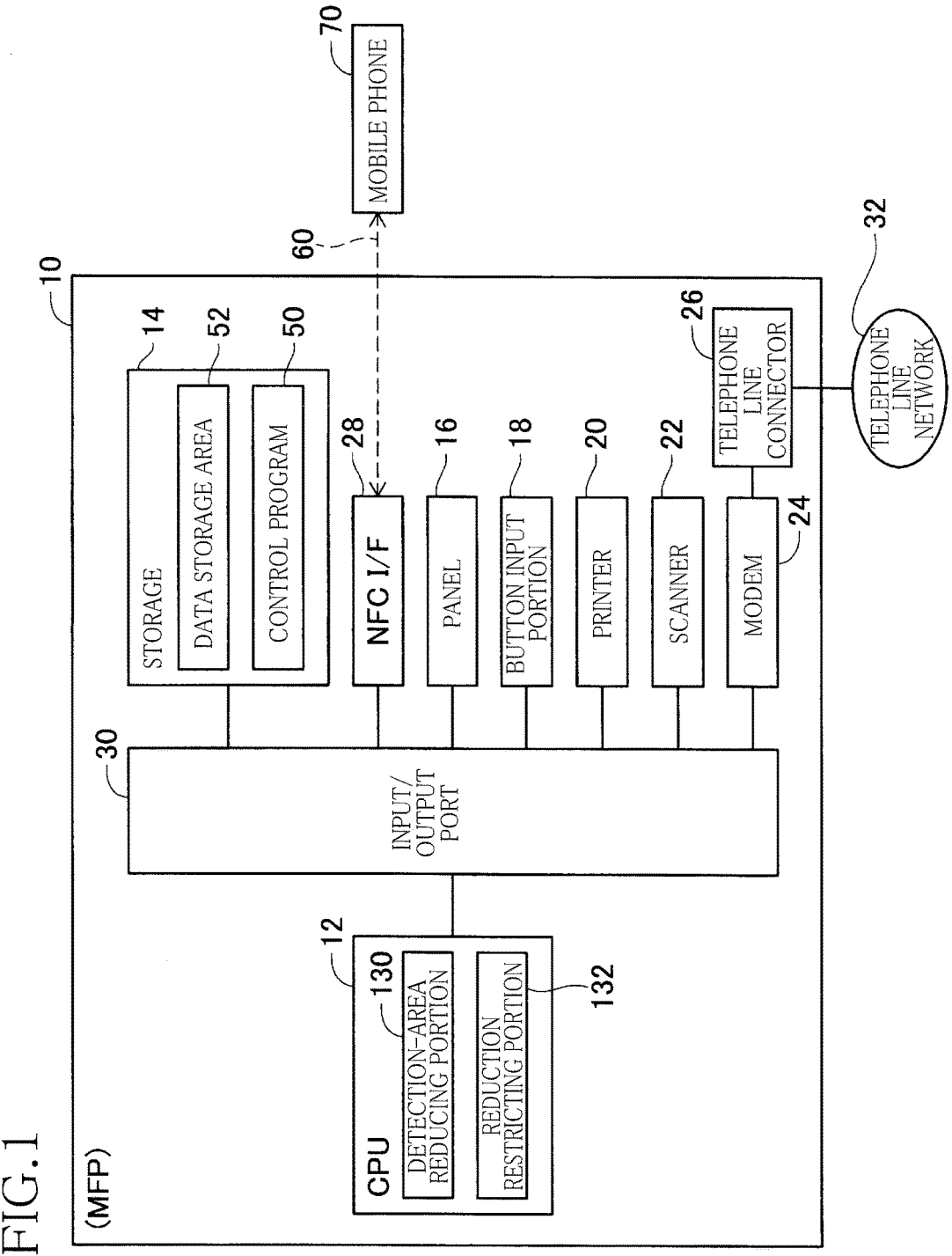
FIG. 1 is a block diagram of an MFP 10.

FIG. 1 is a block diagram of a Multifunction Peripheral (MFP) (as one example of a communication device in the present invention) 10 according to one embodiment of the present invention. The MFP 10 mainly includes a Central Processing Unit (CPU) (as one example of a controller and one example of a computer) 12, a storage 14, a panel 16, a button input portion 18, a printer 20, a scanner 22, a modem 24, a telephone line connector 26, an NFC (Near Field Communication) I/F (as one example of a near field communicator) 28. These components are communicably coupled to one another via an input/output port 30.

The panel 16 has a display surface on which various functions of the MFP 10 are to be displayed. The button input portion 18 includes touch sensors and is configured to detect an approach or a touch of an input tool (that will be described) to or on the button input portion 18 and to accept a button operation by a user. The input tool may be referred to as an input object.

The printer 20 is configured to perform printing. The scanner 22 is configured to scan a document to form scan data. The modem 24 is configured to convert document data to be sent by a facsimile function into a signal transmittable to a telephone line network 32 and to send the signal to the telephone line network 32 via the telephone line connector 26. The modem 24 is also configured to receive a signal from the telephone line network 32 via the telephone line connector 26 and to decode the signal into document data.

The CPU 12 is configured to execute processing according to a control program (as one example of a program) 50 stored in the storage 14. The control program 50 is a program for changing an area of detection of a touch or an approach of the input tool by each of the touch sensors of the button input portion 18. It is noted that the storage 14 is constituted by a combination of a Random Access Memory (RAM), a Read Only Memory (ROM), a flash memory, a hard disc (HDD), a buffer of the CPU 12, and so on.

The storage 14 has a data storage area 52. The data storage area 52 is an area for storing various data such as image data for displaying an image on the panel 16 and data necessary for execution of the control program 50.

The NFC I/F 28 is configured to be capable of performing wireless communication 60 according to NFC (near field communication) with a mobile phone 70 (as one example of an information processing terminal) based on the international standard ISO/IEC21481 or ISO/IEC18092. That is, the MFP 10 is capable of performing data communication directly with the mobile phone 70 when the wireless communication 60 according to NFC is available.

<Operation of MFP>

Figure 2:
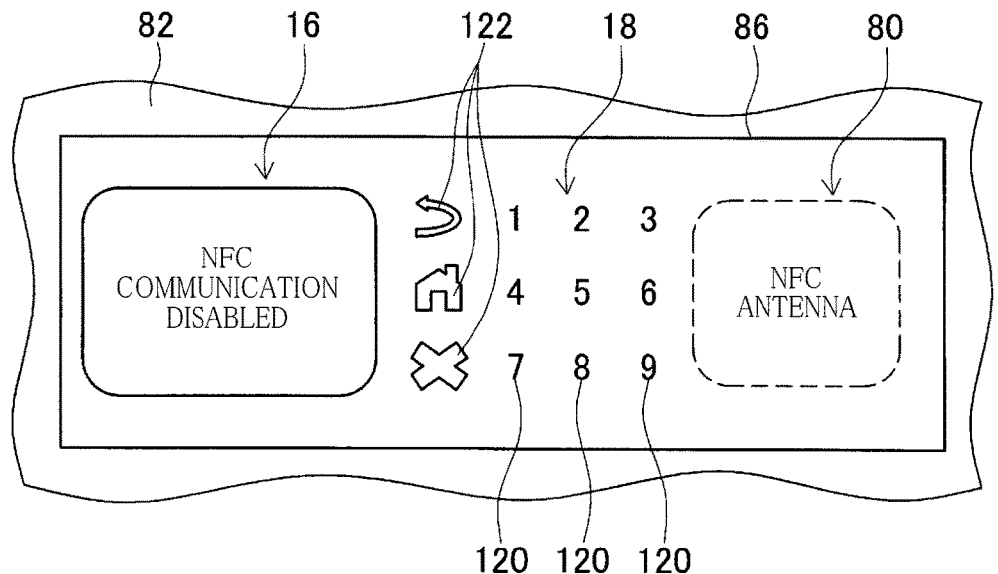
FIG. 2 is a plan view showing a panel 16, a button input portion 18, and an antenna portion 80 of an NFC I/F 28 in the MFP 10.

As described above, the MFP 10 is capable of performing the wireless communication 60 according to NFC (hereinafter referred to as NFC communication where appropriate) via the NFC I/F 28 and is capable of performing data communication directly with the mobile phone 70. More specifically, the NFC I/F 28 includes an antenna portion (as one example of an antenna portion) 80 configured to transmit and receive a radio wave used in the wireless communication 60 with the mobile phone 70. As shown in FIG. 2, the antenna portion 80 is disposed on an upper surface (as one example of one surface) of a body (as one example of a body) 82 of the MFP 10. The button input portion 18 is disposed next to (on the left side of) the antenna portion 80, and the panel 16 is disposed next to (on the left side of) the button input portion 18.

Figure 3:
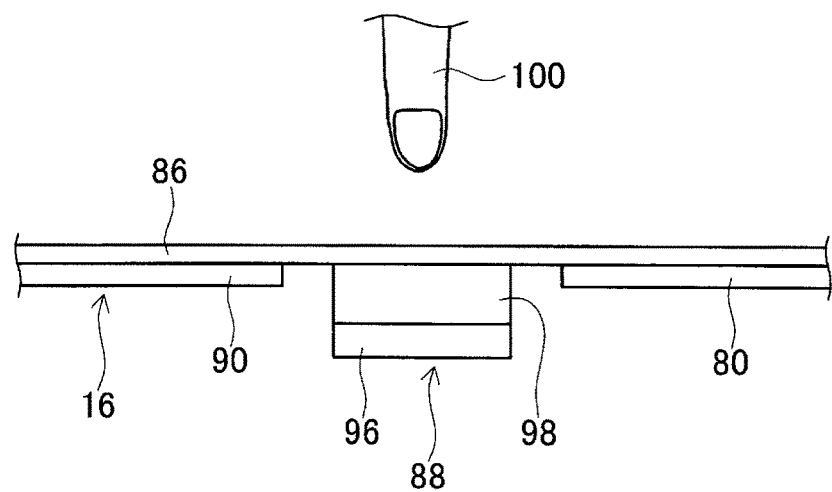
FIG. 3 is a cross-sectional view showing the panel 16, the button input portion 18, and the antenna portion 80 of the NFC I/F 28 in the MFP 10.

As shown in FIG. 3, the antenna portion 80 is covered with a top cover (as one example of a sensor top cover, one example of a communicator top cover, and one example of a plate member) 86. The top cover 86 also covers the touch sensors 88 (each as one example of a touch sensor) of the button input portion 18 and a display portion 90 of the panel 16. That is, one top cover 86 functions as a top cover of the antenna portion 80, a top cover of the button input portion 18, and a top cover of the panel 16.

For establishing the NFC communication between the MFP 10 and the mobile phone 70, the user brings the mobile phone 70 near to the antenna portion 80. When a distance between the mobile phone 70 and the antenna portion 80 falls within a communication area of wireless communication of the mobile phone 70 or a communication area of wireless communication of the antenna portion 80 by the approach of the mobile phone 70 to the antenna portion 80, the NFC communication is established between the mobile phone 70 and the antenna portion 80, namely, between the mobile phone 70 and the MFP 10. Thus, the MFP 10 is capable of transmitting and receiving data such as telephone numbers and images to and from the mobile phone 70 utilizing the NFC communication.

In the MFP 10, however, the antenna portion 80 of the NFC I/F 28 is disposed in the proximity of the touch sensors 88 of the button input portion 18. Accordingly, the radio wave used in the NFC communication may cause erroneous activation of the touch sensors 88, in other words, the touch sensors 88 may be erroneously activated by the radio wave. Further, the touch sensors 88 may be erroneously activated by the mobile phone 70 or fingers of the user (functioning as the input tool) holding the mobile phone 70 when the user brings the mobile phone 70 near to the antenna portion 80 for establishing the NFC communication between the MFP 10 and the mobile phone 70. A distance between the antenna portion 80 and the touch sensors 88 is suitably determined in designing the device. In the MFP 10, the distance between the antenna portion 80 and the touch sensors 88 is a distance that causes interference between the radio wave used in the wireless communication 60 and the touch sensors 88 when the NFC communication becomes possible between the mobile phone 70 and the antenna portion 80, in an instance where the intensity of the radio wave is normal and the detection ability of the touch sensors 88 is normal.

There will be explained in detail a detecting method of detecting the input tool by the touch sensors 88. As shown in FIG. 3, each touch sensor 88 includes a base body (base plate, main body) 96 and an LED 98. The LED 98 is configured to illuminate a portion of the top cover 86 corresponding to the touch sensor 88. When the LEDs 98 of the respective touch sensors 88 are tuned on, buttons of the button input portion 18 are displayed on the top cover 86, as shown in FIG. 2. The base body 96 is configured to be capable of detecting a change in capacitance over the portion of the top cover 86. Accordingly, when an input tool 100 such as the finger or the like approaches over the top cover 86, the change in capacitance is detected by the base body 96. A value of the change in capacitance detected by the base body 96 is treated as a detection value (detected value), and the detection value is amplified by a certain amplification coefficient (gain) so as to obtain an amplified value. The amplified value is treated as a sensor value of the touch sensor 88, and it is judged whether or not the sensor value is larger than a threshold, in other words, it is judged whether or not the sensor value has exceeded the threshold.

Where the sensor value is larger than the threshold, it is judged that the input tool has entered an area in which a touch or an approach of the input tool is detectable by the touch sensor 88 (hereinafter referred to as a sensor detection area where appropriate). As a result, the touch or the approach of the input tool is detected by the touch sensor 88. On the other hand, where the sensor value is not larger than the threshold, it is judged that the input tool does not enter the sensor detection area. In this instance, the touch or the approach of the input tool is not detected by the touch sensor 88. It is noted the thus constructed touch sensor 88 is called a touch sensor of capacitance type.

Figure 4:
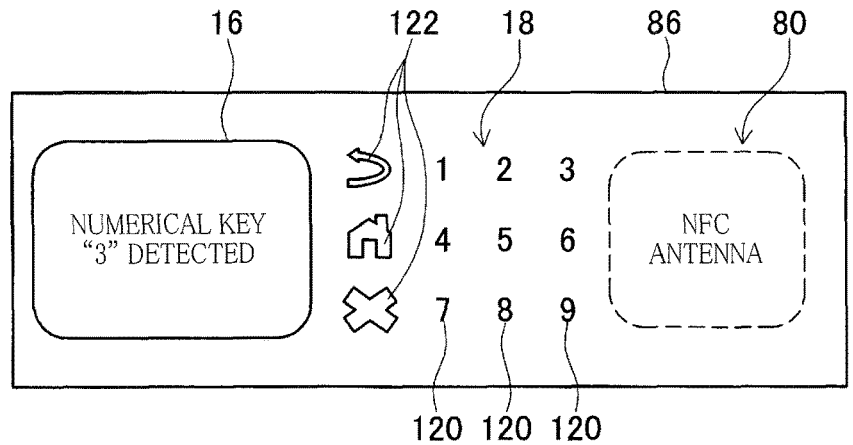
FIG. 4 is a plan view showing the panel 16, the button input portion 18, and the antenna portion 80 of the NFC I/F 28 in the MFP 10 and a table that indicates detection values by the touch sensors of numerical keys, amplification coefficients, sensor values, and a threshold.

There will be explained concretely the detecting method when the user operates on a specific key of the button input portion 18. As shown in FIG. 4, the button input portion 18 is constituted by nine numerical keys 120 and three individual keys 122. With reference to a table shown in FIG. 4, there will be explained in detail the detecting method when the numerical key 120 indicating "3" is operated among the nine numerical keys 120. When the user brings the input tool 100 such as his/her finger or the like near the numerical key 120 indicating "3", the detection value (=10) is detected by the touch sensor 88 of the numerical key 120 indicating "3". Further, when the input tool 100 approaches the numerical key 120 indicating "3", the input tool 100 also approaches the numerical key 120 indicating "6". Accordingly, the detection value (=3) is detected by the touch sensor 88 of the numerical key 120 indicating "6".

However, a distance between the input tool 100 and the touch sensor 88 of the numerical key 120 indicating "6" is longer than a distance between the input tool 100 and the touch sensor 88 of the numerical key 120 indicating "3". Therefore, the detection value (=3) detected by the touch sensor 88 of the numerical key 120 indicating "6" is smaller than the detection value (=10) detected by the touch sensor 88 of the numerical key 120 indicating "3". Because the touch sensor 88 of the numerical key 120 indicating "9" is distant from the touch sensor 88 of the numerical key 120 indicating "3", the touch sensor 88 of the numerical key 120 indicating "9" detects no detection value. That is, the detection value is 0.

Subsequently, the detection value detected by each touch sensor 88 is amplified by a certain amplification coefficient (gain). Concretely, by multiplying the detection value by the amplification coefficient (=10), a sensor value is calculated. It is then judged whether the sensor value of each touch sensor 88 is larger than the threshold (=50), namely, the sensor value of each touch sensor 88 has exceeded the threshold (=50). The sensor value of the touch sensor 88 of the numerical key 120 indicating "3" is 100 and is accordingly larger than the threshold (=50). On the other hand, the sensor value of the touch sensor 88 of the numerical key 120 indicating "6" is 30 and is accordingly not larger than the threshold (=50). Accordingly, the touch or the approach of the input tool is detected by the touch sensor 88 of the numerical key 120 indicating "3". That is, it is judged that the numerical key 120 indicating "3" is operated.

Figure 5:
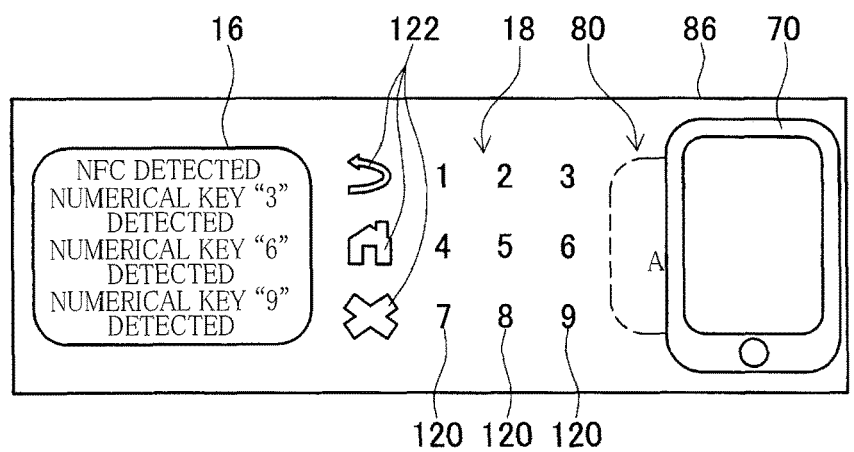
FIG. 5 is a plan view showing the panel 16, the button input portion 18, and the antenna portion 80 of the NFC I/F 28 in the MFP 10 and a table that indicates detection values by the touch sensors of numerical keys, amplification coefficients, sensor values, and a threshold.

Thus, each touch sensor 88 detects a touch or an approach of the input tool utilizing a change in capacitance, in other words, by detecting a change in capacitance. Accordingly, when the mobile phone 70 is brought near to the antenna portion 80, the capacitance changes and the touch sensors 88 may be erroneously activated. More specifically, when the mobile phone 70 is brought near to the antenna portion 80 as shown in FIG. 5, the capacitance in the vicinity of the antenna portion 80 changes by the mobile phone 70 or fingers of the user (functioning as the input tool) holding the mobile phone 70 or the capacitance in the vicinity of the antenna portion 80 changes by a radio wave used in the wireless communication 60 according to NFC. Due to the change in capacitance in the vicinity of the antenna portion 80, the detection value (=6) is detected by each of the respective touch sensors 88 of the numerical key 120 indicating "3", the numerical key 120 indicating "6", and the numerical key 120 indicating "9". The sensor value obtained by multiplying the detection value by the amplification coefficient (=10) is 60 in all of the numerical key 120 indicating "3", the numerical key 120 indicating "6", and the numerical key 120 indicating "9". In other words, the sensor value (=60) of each of the respective touch sensors 88 of the numerical key 120 indicating "3", the numerical key 120 indicating "6", and the numerical key 120 indicating "9" is larger than the threshold (=50) and it is accordingly judged that the numerical key 120 indicating "3", the numerical key 120 indicating "6", the numerical key 120 indicating "9" is operated.

In this instance, in spite of the fact that the user has no intention to operate the numerical keys 120, there arises a risk that the numerical keys 120 may be erroneously activated by bringing the mobile phone 70 near to the antenna portion 80. In view of this, in the MFP 10, the sensor detection area for each touch sensor 88 is made smaller than a communication area in which the NFC communication by the mobile phone 70 and the antenna portion 80 is possible. (Hereinafter, this communication area may be referred to as "NFC communication area" where appropriate.) In other words, a distance within which a touch or an approach of the input tool 100 is detectable by the touch sensor 88 is made shorter than a distance within which the NFC communication by the antenna portion 80 and the mobile phone 70 is possible.

Figure 6:
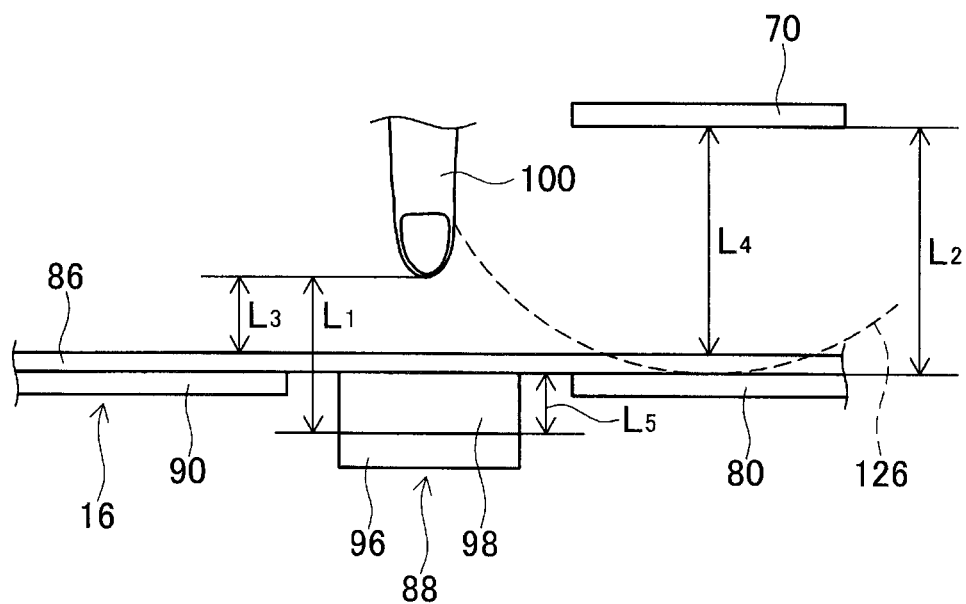
FIG. 6 is a cross-sectional view showing the panel 16, the button input portion 18, and the antenna portion 80 of the NFC I/F 28 in the MFP 10.

More specifically, the input tool 100 shown in FIG. 6 is located at a position, in the sensor detection area, that is the most distant from the touch sensors 88. A distance (=$L_1$) between the input tool 100 and the base body 96 of each touch sensor 88 is a maximum distance at which a touch or an approach of the input tool 100 can be detected by the touch sensor 88. In other words, if the input tool 100 is located distant from the touch sensor exceeding the distance $L_1$, the input tool 100 cannot be detected by the touch sensor 88.

On the other hand, the mobile phone 70 shown in FIG. 6 is located at a position, in the NFC communication area, that is the most distant from the antenna portion 80. A distance (=$L_2$) between the mobile phone 70 and the antenna portion 80 is a maximum distance at which the NFC communication by the antenna portion 80 with the mobile phone 70 is possible. In other words, if the mobile phone 70 is located distant from the antenna portion 80 exceeding the distance $L_2$, the NFC communication by the antenna portion 80 with the mobile phone 70 is impossible. The NFC communication area is an area in which the antenna portion 80 can receive a radio wave 126 generated from the mobile phone 70 and may be referred to as an area in which the radio wave 126 used in the NFC communication reaches the antenna portion 80.

As apparent from FIG. 6, the distance (=$L_1$) within which a touch or an approach of the input tool 100 is detectable by the each sensor 88 is made shorter than a distance (=$L_2$) within which the NFC communication by the antenna portion 80 with the mobile phone 70 is possible. In the arrangement, it is possible for the antenna portion 80 to receive the radio wave 126 before the radio wave 126 generated from the mobile phone 70 enters the sensor detection area, thereby obviating erroneous activation of the touch sensor 88.

Figure 7:
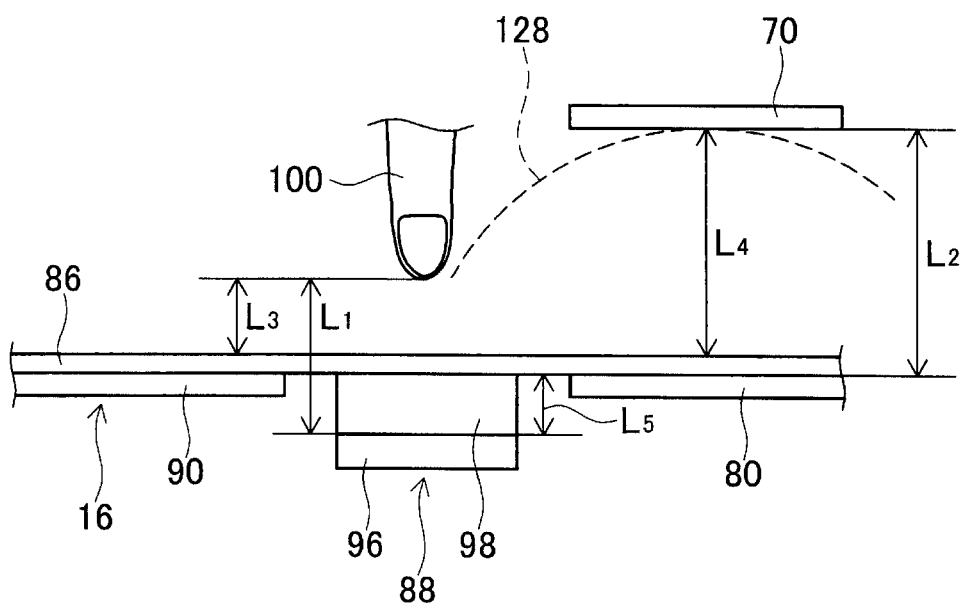
FIG. 7 is a cross-sectional view showing the panel 16, the button input portion 18, and the antenna portion 80 of the NFC I/F 28 in the MFP 10.

The radio wave used in the wireless communication 60 according to NFC includes not only the radio wave 126 generated from the mobile phone 70, but also a radio wave 128 generated from the antenna portion 80, as shown in FIG. 7. When the wireless communication 60 according to NFC is performed using the radio wave 128, the mobile phone 70 needs to enter an area of the radio wave 128, namely, the NFC communication area. In this instance, when the mobile phone 70 or user's fingers or the like holding the mobile phone 70 enters the sensor detection area, there arises a risk that the touch sensors 88 may be erroneously activated.

In the MFP10, however, the distance (=$L_1$) within which a touch or an approach of the input tool 100 is detectable by each touch sensor 88 is made shorter than the distance (=$L_2$) within which the NFC communication of the antenna portion 80 and the mobile phone 70 is possible. Accordingly, when the mobile phone 70 is brought near to the antenna portion 80, the mobile phone 70 can receive the radio wave 128 before the mobile phone 70 or the user's fingers or the like holding the mobile phone 70 enters the sensor detection area, thereby obviating erroneous activation of the touch sensors 88.

As apparent from FIGS. 6 and 7, a distance (=$L_3$) between the input tool 100 and a surface of the top cover 86 is made shorter than a distance (=$L_4$) between the mobile phone 70 and the surface of the top cover 86. In the arrangement, although the touch sensors 88 need to be operated near the top cover 86, the NFC communication can be performed with the mobile phone 70 located distant from the top cover 86. That is, even if the mobile phone 70 is somewhat spaced apart from the antenna portion 80, the NFC communication can be performed, thereby preventing the mobile phone 70 from approaching the touch sensors 88. Also in the arrangement, erroneous activation of the touch sensors 88 can be obviated.

The antenna portion 80 is disposed so as to be in contact with the top cover 86 while the base body 96 of each touch sensor 88 is disposed slightly distant from the top cover 86. More specifically, a distance between the antenna portion 80 and the top cover 86 is substantially 0 and is shorter than a distance ($=L_5$) between the base body 96 and the top cover 86. That is, the antenna portion 80 is disposed so as to be located nearer to the top cover 86 than the base body 96, enabling the antenna portion 80 to easily transmit and receive the radio wave 126 used in the NFC communication. Accordingly, it is not necessary to employ a large-sized antenna portion, ensuring space savings.

As stated above, in the MFP 10, erroneous activation of the touch sensors 88 is obviated by adjusting the size of the sensor detection area, the size of the NFC communication area, and so on. However, when the user brings the mobile phone 70 near to the antenna portion 80 for performing the NFC communication, the user sometimes moves the mobile phone 70 to a position at which the mobile phone 70 is much closer to the antenna portion 80 than the positions of the mobile phone 70 shown in FIGS. 6 and 7. In other words, there is an instance in which the user moves the mobile phone 70 much closer to the antenna portion 80 in spite of the fact that the mobile phone 70 has already entered the NFC communication area. In an extreme case, the user places the mobile phone 70 on the top cover 86. In such an instance, even if the sensor detection area is made smaller than the NFC communication area, there is a risk that the touch sensors 88 may be erroneously activated.

In view of the above, in the MFP 10, the sensor detection area is reduced when the NFC communication is performable. More specifically, in the MFP 10, a communication-performable state in which the NFC communication can be performed and a communication-unperformable state in which the NFC communication cannot be performed are selectively established. In the communication-unperformable state, there is displayed, on the panel 16 of the MFP 10, a display screen indicating that the NFC communication cannot be performed, namely, the NFC communication is disabled, as shown in FIG. 2. Accordingly, the user recognizes that the NFC communication cannot be performed and does not bring the mobile phone 70 near to the antenna portion 80.

Figure 8:
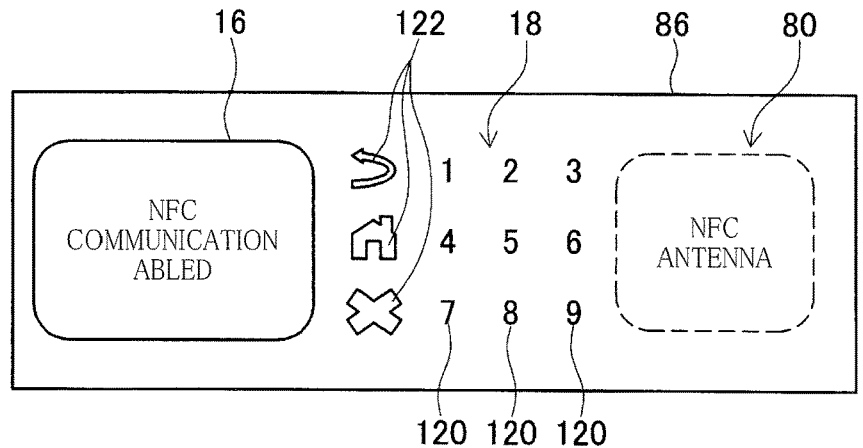
FIG. 8 is a plan view showing the panel 16, the button input portion 18, and the antenna portion 80 of the NFC I/F 28 in the MFP 10 and a table that indicates detection values by the touch sensors of numerical keys, amplification coefficients, sensor values, and a threshold.

The MFP 10 is provided with a button (not shown) for enabling the NFC communication. When the button is operated by the user, there is indicated, on the panel 16, a display screen indicating that the NFC communication can be performed, namely, the NFC communication is abled, as shown in FIG. 8. While the display screen is being displayed on the panel 16, the NFC communication can be performed, and the user brings the mobile phone 70 near to the antenna portion 80 when the user wishes to perform the NFC communication. Therefore, the sensor detection area is reduced in an instance where there is a possibility that the user brings the mobile phone 70 near to the antenna portion 80, namely, in an instance where the NFC communication is performable, for the purpose of preventing the touch sensors 88 from being erroneously activated.

Figure 9:
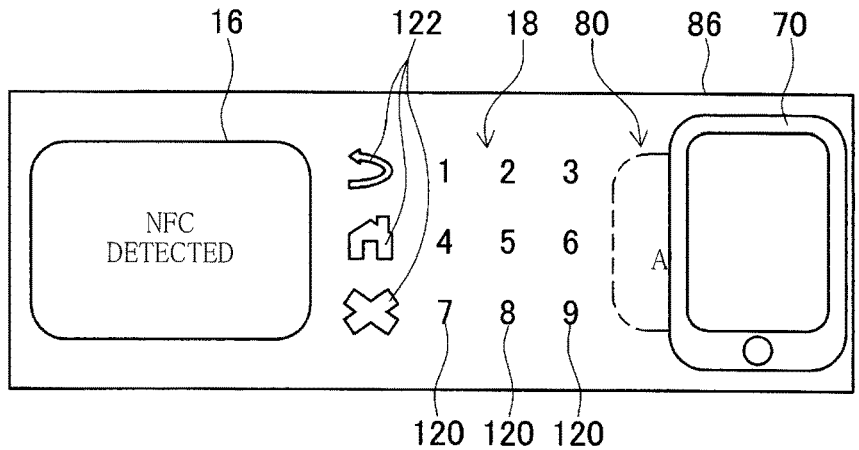
FIG. 9 is a plan view showing the panel 16, the button input portion 18, and the antenna portion 80 of the NFC I/F 28 in the MFP 10 and a table that indicates detection values by the touch sensors of numerical keys, amplification coefficients, sensor values, and a threshold.

Concretely, by decreasing, down to 6, the amplification coefficient for amplifying the detection value, the sensor detection area is reduced for thereby preventing erroneous activation of the touch sensors 88. For instance, when the mobile phone 70 is brought near to the antenna portion 80 as shown in FIG. 9, the capacitance in the vicinity of the antenna portion 80 changes due to the approach of the mobile phone 70 or the like or the radio wave used in the wireless communication 60 according to NFC. As a result, the detection value ($=6$) is detected by each of the respective touch sensors 88 of the numerical key 120 indicating "3", the numerical key 120 indicating "6", and the numerical key 120 indicating "9". The sensor value obtained by multiplying the detection value by the amplification coefficient ($=6$) is 36 in all of the numerical key 120 indicating "3", the numerical key 120 indicating "6", and the numerical key 120 indicating "9". In other words, the sensor value ($=36$) of each of the touch sensors 88 of the numerical key 120 indicating "3", the numerical key 120 indicating "6", and the numerical key 120 indicating "9" is not larger than the threshold ($=50$), and it is accordingly judged that the numerical key 120 indicating "3", the numerical key 120 indicating "6", and the numerical key 120 indicating "9" are not operated. Thus, it is possible to prevent erroneous activation of the touch sensors 88 which would be otherwise caused when the mobile phone 70 is brought near to the antenna portion 80.

Figure 10:
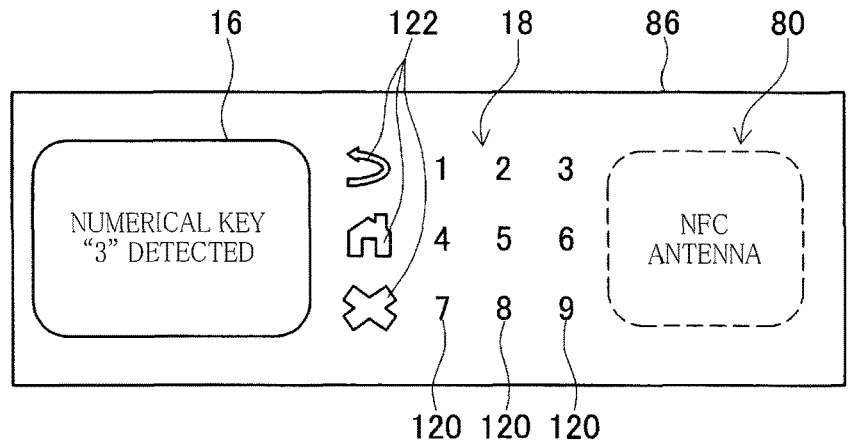
FIG. 10 is a plan view showing the panel 16, the button input portion 18, and the antenna portion 80 of the NFC I/F 28 in the MFP 10 and a table that indicates detection values by the touch sensors of numerical keys, amplification coefficients, sensor values, and a threshold.

Even where the amplification coefficient is decreased, it is possible to suitably detect user's operations on the numerical keys 120. For instance, when the user brings the input tool 100 such as his/her finger or the like near to the numerical key 120 indicating "3" for operating the numerical key 120 indicating "3", the detection value ($=10$) is detected by the touch sensor 88 of the numerical key 120 indicating "3", as shown in the table of FIG. 10. Further, when the input tool 100 approaches the numerical key 120 indicating "3", the input tool 100 also approaches the numerical key 120 indicating "6". As a result, the detection value ($=3$) is detected by the touch sensor 88 of the numerical key 120 indicating "6".

By multiplying the detection value detected by each touch sensor 88 with the amplification coefficient ($=6$), the sensor value is calculated, and it is judged whether the sensor value of each touch sensor 88 is larger than the threshold ($=50$). The sensor value of the touch sensor 88 of the numerical key 120 indicating "3" is 60 and is accordingly larger than the threshold ($=50$) whereas the sensor value of the touch sensor 88 of the numerical key 120 indicating "6" is 18 and is accordingly not larger than the threshold ($=50$). Therefore, the touch or the approach of the input tool is detected by the touch sensor 88 of the numerical key 120 indicating "3", and it is judged that the numerical key 120 indicating "3" is operated.

By thus decreasing, down to 6, the amplification coefficient for amplifying the detection value, the touch sensors 88 can be prevented from being erroneously activated and the input tool 100 can be appropriately detected by the touch sensors 88. Further, the MFP 10 is configured to change a reduction ratio of the sensor detection area in accordance with a distance between each touch sensor 88 and the antenna portion 80. More specifically, when the touch sensors 88 are distant from the antenna portion 80, the touch sensors 88 are less likely to be influenced by the mobile phone 70 or the like or by the radio wave 126 used in the NFC communication. In view of this, the reduction ratio of the sensor detection area of each of the touch sensors 88 that are more distant from the antenna portion 80 is made smaller than that of each of the touch sensors 88 that are nearer to the antenna portion 80.

Figure 11:
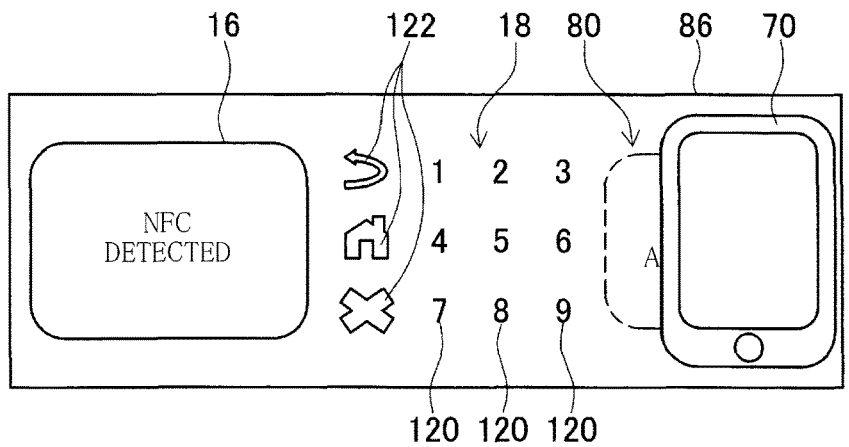
FIG. 11 is a plan view showing the panel 16, the button input portion 18, and the antenna portion 80 of the NFC I/F 28 in the MFP 10 and a table that indicates detection values by the touch sensors of numerical keys, amplification coefficients, sensor values, and a threshold.

Concretely, the amplification coefficient used in each of the respective touch sensors 88 of the numerical key 120 indicating "2", the numerical key 120 indicating "5", and the numerical key 120 indicating "8" is changed to 8 when the NFC communication is performable. In this instance, when the mobile phone 70 is brought near to the antenna portion 80, the detection value ($=4$) is detected by each of the respective touch sensors 88 of the numerical key 120 indicating "2", the numerical key 120 indicating "5", and the numerical key 120 indicating "8", as indicated in the table of FIG. 11. The sensor value obtained by multiplying the detection value by the amplification coefficient (=8) is 32 in all of the numerical key 120 indicating "2", the numerical key 120 indicating "5", and the numerical key 120 indicating "8". In other words, the sensor value (=32) of each of the respective touch sensors 88 of the numerical key 120 indicating "2", the numerical key 120 indicating "5", and the numerical key 120 indicating "8" is not larger than the threshold (=50), and it is accordingly judged that the numerical key 120 indicating "2", the numerical key 120 indicating "5", and the numerical key 120 indicating "8" are not operated.

Thus, the MFP 10 is configured such that the reduction ratio of the sensor detection area of each of the touch sensors 88 that are less likely to be influenced by the approach of the mobile phone 70 or the like or by the radio wave 126 used in the NFC communication is made smaller to thereby obviate deterioration in operability. The arrangement prevents erroneous activation of the touch sensors 88 which would be otherwise caused when the mobile phone 70 is brought near to the antenna portion 80 and obviates deterioration in operability. The amplification coefficient used in each of the respective touch sensors 88 of the numerical key 120 indicating "1", the numerical key 120 indicating "4", and the numerical key 120 indicating "7" is changed to 9 when the NFC communication is performable, thereby further obviating deterioration in operability.

In the MFP 10, the numerical keys 120 are disposed near the antenna portion 80 while the individual keys 122 are disposed distant from the antenna portion 80. Accordingly, the numerical keys 120 are likely to be influenced by the approach of the mobile phone 70 or the like or by the radio wave 126 of the mobile phone 70 that is brought near to the antenna portion 80 whereas the individual keys 122 are less likely to be influenced by the approach of the mobile phone 70 or the like or by the radio wave 126. Therefore, even when the NFC communication is performable, the amplification coefficient of each individual key 122 is not decreased, so that the sensor detection area is not reduced. Accordingly, the individual keys 122 can be operated as usual when the NFC communication is performable.

The touch sensors 88 of the numerical keys 120 that are disposed near the antenna portion 80 may be referred to as touch sensors disposed within a region of the radio waves 126, 128 while the touch sensors 88 of the individual keys 122 that are disposed distant from the antenna portion 80 may be referred to as touch sensors disposed outside the region of the radio waves 126, 128.

In the MFP 10, the sensor detection areas of the respective touch sensors 88 are inhibited from being reduced in an instance where operation keys, i.e., the numerical keys 120 and the individual keys 122, are successively operated in a situation in which the sensor detection areas are reduced. In other words, in the instance where the operation keys 120, 122 are successively operated in a situation in which the amplification coefficients of the respective touch sensors 88 are reduced, the amplification coefficients are changed back to the original value (=10). This is because the user normally desires to preferentially perform button input using the operation keys 120, 122 in the instance where the operation keys 120, 122 are successively operated. The arrangement enables the user to appropriately perform desired button input.

Judgment as to successive operations on the operation keys 120, 122 is made on the basis of a number of detection times of the input tool by the touch sensors 88 of the operation keys 120, 122. That is, where the number of detection times of the input tool by the touch sensors 88 of the operation keys 120, 122 within a predetermined time period is a plurality of times, it is judged that the operation keys 120, 122 are successively operated.

<Control Program>

Figure 12:
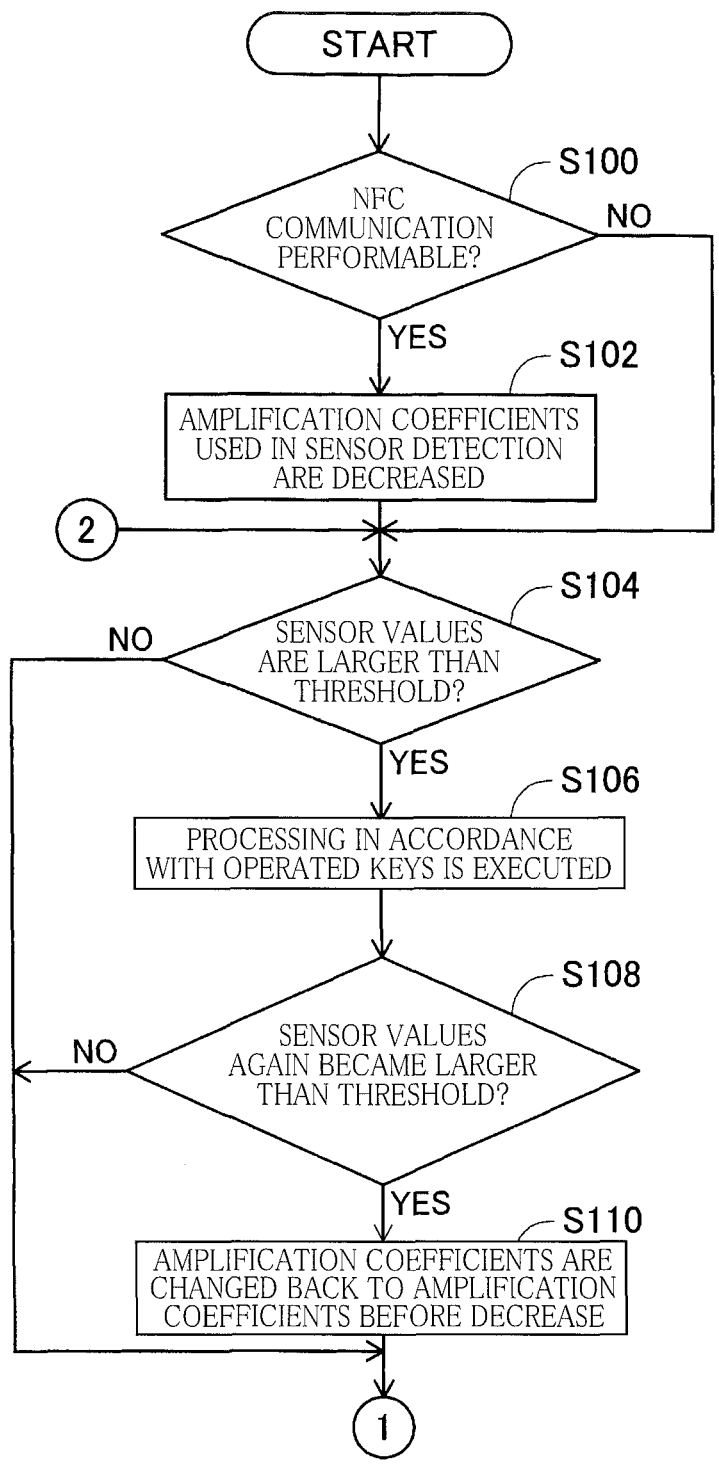
FIG. 12 is a flow chart showing processing in the MFP 10.
Figure 13:
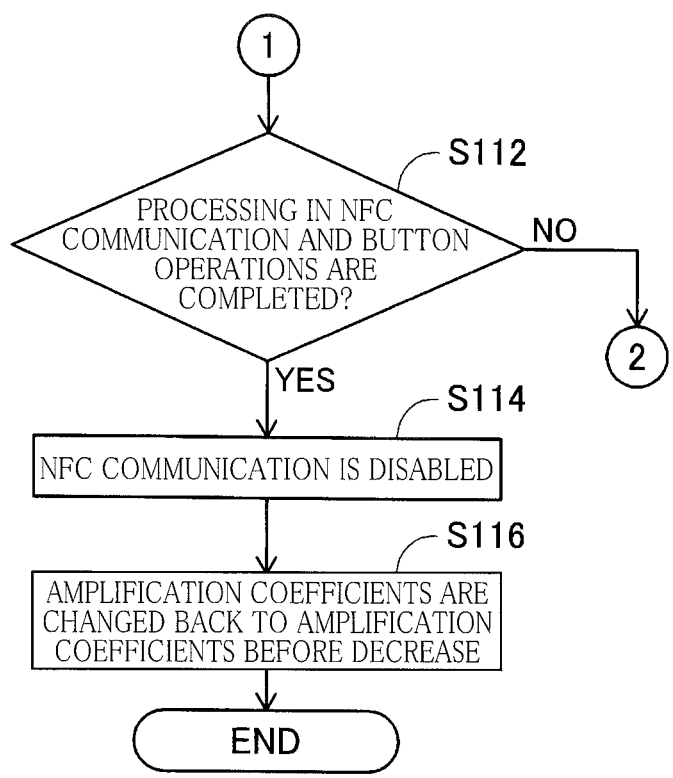
FIG. 13 is a flow chart showing processing in the MFP 10.

The reduction of the sensor detection areas of the respective touch sensors 88 described above is executed by execution of the control program 50 by the CPU 12. With reference to FIGS. 12 and 13, there will be concretely explained a flow for reducing the sensor detection areas when the NFC communication is performable. The program is repeatedly executed when the MFP 10 is turned on. Further, in parallel with execution of the program, the MFP 10 performs the NFC communication with the mobile phone 70 when the mobile phone 70 is brought near to the antenna portion 80 by a suitable distance at which the mobile phone 70 can communicate with the antenna portion 80 in a state in which the NFC communication is enabled.

According to the control program 50, it is judged by the CPU 12 whether the NFC communication is performable (Step 100). (Hereinafter, "Step" is abbreviated as "S".) As described above, the MFP 10 is provided with the button for enabling the NFC communication. It is judged that the NFC communication is performable when the NFC communication is enabled by the button. If the NFC communication is performable (S100: YES), the amplification coefficients used in the touch sensors 88 of the numerical keys 120 are decreased (S102). Each amplification coefficient after decrease is set in accordance with the distance between the corresponding numerical key 120 and the antenna portion 80. On the other hand, if the NFC communication is not performable (S100: NO), the processing in S102 is skipped.

Subsequently, it is judged by the CPU 12 whether the sensor values detected by the touch sensors 88 of the operation keys 120, 122 are larger than the threshold (S104). In other words, it is judged whether the operation keys 120, 122 are operated. If the sensor values by the touch sensors 88 of the operation keys 120, 122 are not larger than the threshold, namely, if the operation keys 120, 122 are not operated (S104: NO), the control flow proceeds to S112.

On the other hand, if the sensor values by the touch sensors 88 of the operation keys 120, 122 are larger than the threshold, namely, if the operation keys 120, 122 are operated (S104: YES), there is executed processing in accordance with the operated operation keys 120, 122 (S106). It is then judged by the CPU 12 whether the operation keys 120, 122 are again operated within a predetermined time period after the operation keys 120, 122 were previously operated (S108).

If the operation keys 120, 122 are not again operated within the predetermined time period (S108: NO), the control flow proceeds to S112. On the other hand, if the operation keys 120, 122 are again operated within the predetermined time period (S108: YES), the decreased amplification coefficients are changed back to the amplification coefficients before decrease (S110). The case in which the operation keys 120, 122 are again operated within the predetermined time period includes input of a destination number for facsimile transmission and setting of number of sheets to be printed when the printer function is used, for instance. It is then judged by the CPU 12 whether processing in the NFC communication and button input on the operation keys 120, 122 (button operations on the operation keys 120, 122) are completed (S112).

Here, the processing in the NFC communication includes printing processing or the like performed by the MFP 10 utilizing the NFC communication. In the printing processing performed by the MFP 10 utilizing the NFC communication, a printing command or the like is transmitted from the mobile phone 70 to the MFP 10 by the NFC communication as a result of an approach of the mobile phone 70 to the antenna portion 80 and printing is performed according to the printing command. When the printing processing is completed, data indicating that the printing processing is completed is transmitted from the MFP 10 to the mobile phone 7 by the NFC communication. That is, it is judged that the processing in the NFC communication is completed when the MFP 10 transmitted, to the mobile phone 70, the data indicating completion of the printing processing or the like. Further, completion of the button operations on the operation keys 120, 122 is determined by judging whether a state in which the operation keys 120, 122 are not operated continues for a predetermined time period. That is, if the state in which the operation keys 120, 122 are not operated continues for the predetermined time period, it is judged that the button operations on the operation keys 120, 122 are completed. This predetermined time period is started to be counted when it is judged in S104 that any sensor value is larger than the threshold. When any sensor value again becomes larger than the threshold before the predetermined time period elapses, the predetermined time period is again started to be counted after having been reset.

If the processing in the NFC communication and the input on the operation keys 120, 122 (the button operations on the operation keys 120, 122) are not completed yet (S112: NO), the control flow returns back to S104. On the other hand, if the processing in the NFC communication and the input on the operation keys 120, 122 (the button operations on the operation keys 120, 122) are completed (S112: YES), the NFC communication is disabled (S114). That is, the MFP 10 is placed into the communication-unperformable state in which the NFC communication cannot be performed. Then the decreased amplification coefficients are changed back to the amplification coefficients before decrease (S116). According to the processing described above, the control program 50 ends.

<Functional Structure of CPU>

It may be considered that the CPU 12 configured to execute the control program 50 described above has a functional structure shown in FIG. 1 in view of processing executed by the CPU 12. As apparent from FIG. 1, the CPU 12 has a detection-area reducing portion 130 and a reduction restricting portion 132.

The detection-area reducing portion 130 is a functional portion to execute the processing in S102 of the control program 50, namely, a functional portion to reduce the amplification coefficients for thereby reducing the sensor detection areas. The reduction restricting portion 132 is a functional portion to execute the processing in S110 of the control program 50, namely, a functional portion to restrict reduction of the sensor detection areas when the operation keys 120, 122 are successively operated.

Second Embodiment

There will be next explained an operation of the MFP 1 according to a second embodiment of the present invention. The MFP 10 of the second embodiment is identical in construction with the MFP 10 in the first embodiment, and a detailed explanation of the construction of the MFP 10 of the second embodiment is dispensed with.

Figure 14:
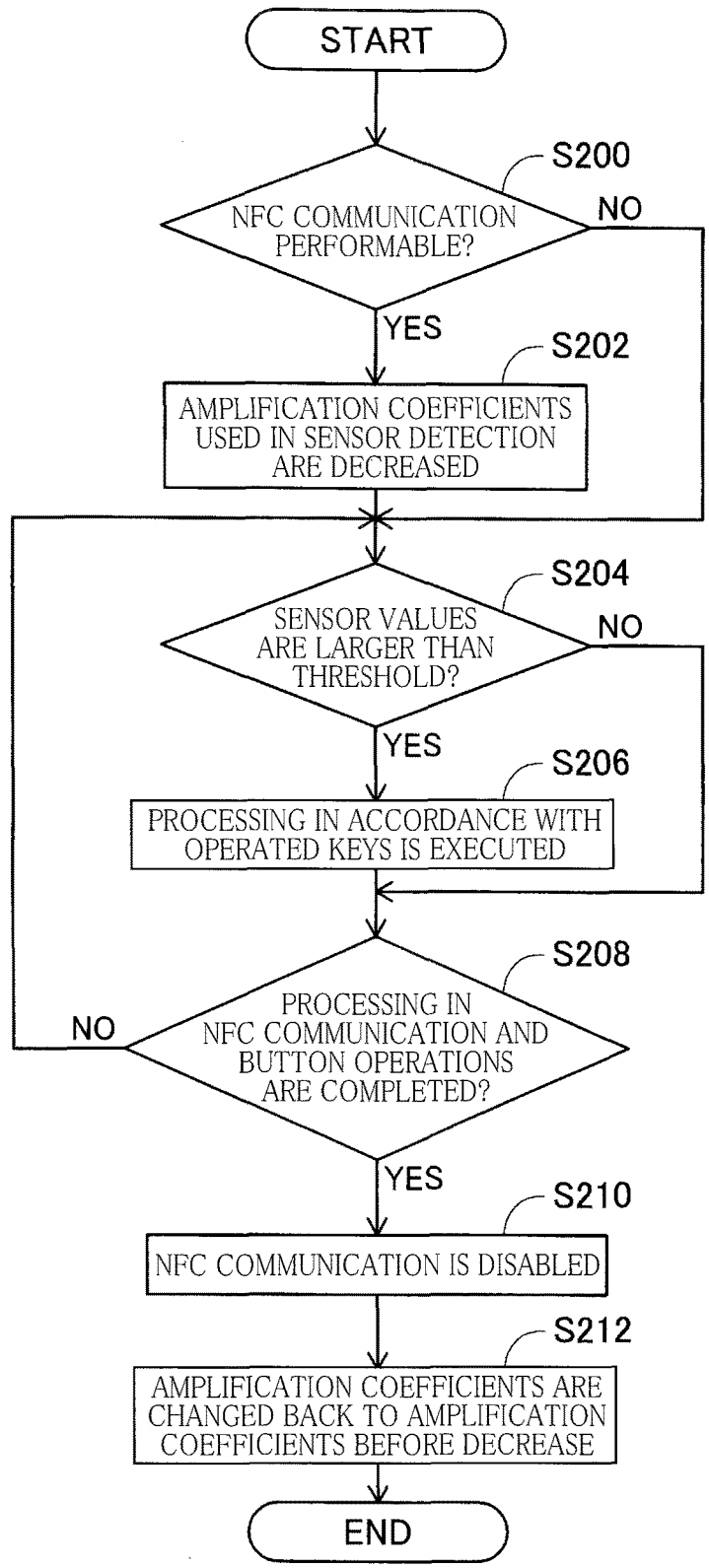
FIG. 14 is a flow chart showing processing in the MFP 10 according to a second embodiment of the invention.

In the MFP 10 of the first embodiment, the sensor detection areas are changed back to original areas when the operation keys 120, 122 are successively operated in a situation in which the sensor detection areas are reduced. In the MFP 10 of the second embodiment, the sensor detection areas remain reduced even the operation keys 120, 122 are successively operated in the situation in which the sensor detection areas are reduced. With reference to FIG. 14, there will be explained a flow for reducing the sensor detection areas in the MFP 10 according to the second embodiment. Because the flow of FIG. 14 is substantially the same as the flow of FIGS. 12 and 13, the flow of FIG. 14 will be briefly explained.

Initially, in S200-S206, there is executed by the CPU 12 the same processing as the processing in S100-S106 of FIG. 12. The control flow then proceeds to S208. In S208-S212, there is executed by the CPU 12 substantially the same processing as the processing in S112-S116 of FIG. 13. Thus, the sensor detection areas are reduced in the MFP 10 of the second embodiment. In the MFP 10 of the second embodiment, even if the operation keys 120, 122 are successively operated in the situation in which the sensor detection areas are reduced, the sensor detection areas remain reduced, so that it is possible to prevent erroneous activation of the touch sensors 88 with high reliability.

Third Embodiment

There will be next explained an operation of the MFP 10 according to a third embodiment of the present invention. The MFP 10 of the third embodiment is identical in construction with the MFP 10 in the first embodiment, and a detailed explanation of the construction of the MFP 10 of the third embodiment is dispensed with.

Figure 15:
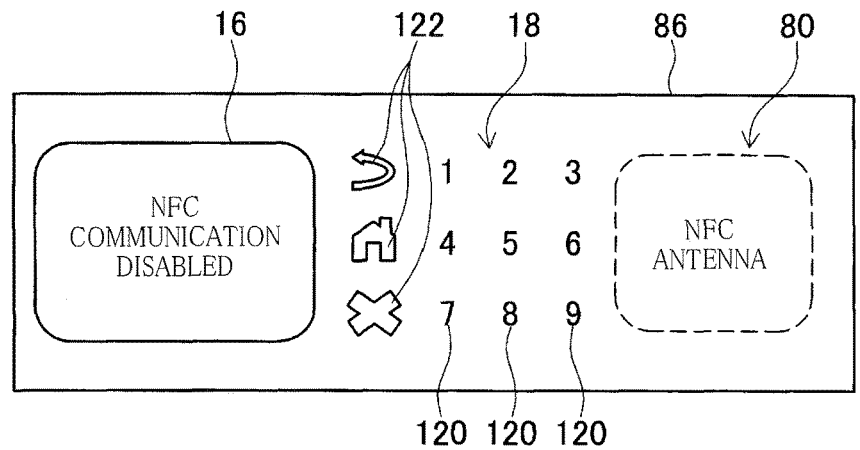
FIG. 15 is a plan view showing the panel 16, the button input portion 18, and the antenna portion 80 of the NFC I/F 28 in the MFP 10 according to a third embodiment of the invention and a table that indicates detection values by the touch sensors of numerical keys, amplification coefficients, sensor values, and a threshold.

In the MFP 10 of the first embodiment, the sensor detection areas are reduced by decreasing the amplification coefficients. In the MFP 10 of the third embodiment, the sensor detection areas are reduced by increasing the threshold. More specifically, in the communication-unperformable state in which the NFC communication cannot be performed, a first threshold is set at 50, and a second threshold is set at 40, as shown in the table of FIG. 15. The first threshold is for detection of a touch or an approach of the input tool 100, and the second threshold is judging separation of the input tool 100 away from the touch sensors 88.

More specifically, when the sensor values are larger than the first threshold, a touch or an approach of the input tool 100 is detected. After the touch or the approach of the input tool 100 was detected, the touch or the approach of the input tool 100 is kept detected until the sensor values becomes equal to or smaller than the second threshold. That is, after the sensor value becomes 51 and the touch or the approach of the input tool 100 is detected, for instance, the touch or the approach of the input tool 100 is kept detected until the sensor values becomes equal to or smaller than 40. This arrangement takes account of the following. Even if the user has no intention to move the input tool 100 away from the touch sensors 88, there is an instance in which the sensor values may be slightly lowered. In such an instance, the above arrangement prevents input through the touch sensors 88 from being switched from ON to OFF.

Figure 16:
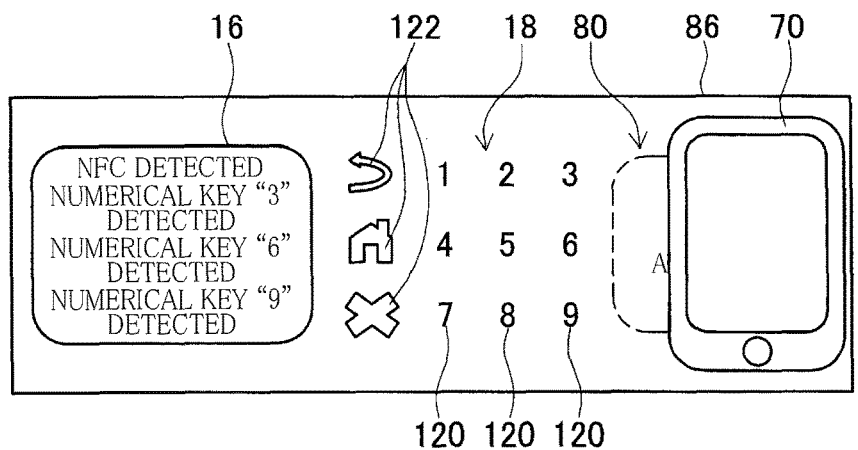
FIG. 16 is a plan view showing the panel 16, the button input portion 18, and the antenna portion 80 of the NFC I/F 28 in the MFP 10 according to the third embodiment of the invention and a table that indicates detection values by the touch sensors of numerical keys, amplification coefficients, sensor values, and a threshold.

When the mobile phone 70 is brought near to the antenna portion 80 in an instance in which the first threshold for detection of a touch or an approach of the input tool 100 is set at 50 and the second threshold for judging separation of the input tool 100 away from the touch sensors 88 is set at 40, the detection value (=6) is detected by each of the respective touch sensors 88 of the numerical key 120 indicating "3", the numerical key 120 indicating "6", and the numerical key 120 indicating "9", as shown in the table of FIG. 16. The sensor value obtained by multiplying the detection value by the amplification coefficient (=10) is 60 in all of the numerical key 120 indicating "3", the numerical key 120 indicating "6", and the numerical key 120 indicating "9". In other words, the sensor value (=60) of each of the respective touch sensors 88 of the numerical key 120 indicating "3", the numerical key 120 indicating "6", and the numerical key 120 indicating "9" is larger than the first threshold (=50), and it is accordingly judged that the numerical key 120 indicating "3", the numerical key 120 indicating "6", and the numerical key 120 indicating "9" are operated.

Figure 17:
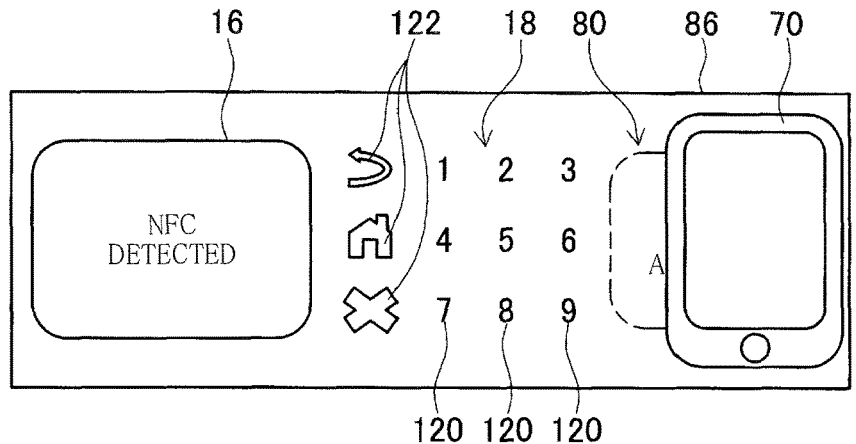
FIG. 17 is a plan view showing the panel 16, the button input portion 18, and the antenna portion 80 of the NFC I/F 28 in the MFP 10 according to the third embodiment of the invention and a table that indicates detection values by the touch sensors of numerical keys, amplification coefficients, sensor values, and thresholds.

In this instance, in spite of the fact that the user has no intention to operate the numerical keys 120, there arises a risk that the numerical keys 120 may be erroneously activated by bringing the mobile phone 70 near to the antenna portion 80. In view of this, in the MFP 10 of the third embodiment, the sensor detection areas are reduced by increasing the threshold when the NFC communication is performable, thereby preventing erroneous activation of the touch sensors 88. For instance, when the mobile phone 70 is brought near to the antenna portion 80, the detection value (=6) is detected by each of the respective touch sensors 88 of the numerical key 120 indicating "3", the numerical key 120 indicating "6", and the numerical key 120 indicating "9", as shown in the table of FIG. 17. The sensor value obtained by multiplying the detection value by the amplification coefficient (=10) is 60 in all of the numerical key 120 indicating "3", the numerical key 120 indicating "6", and the numerical key 120 indicating "9".

In this instance, the first threshold is increased up to 80 when the NFC communication is performable. Accordingly, the sensor value (=60) of each of the respective touch sensors 88 of the numerical key 120 indicating "3", the numerical key 120 indicating "6", and the numerical key 120 indicating "9" is not larger than the first threshold (=80), and it is accordingly judged that the numerical key 120 indicating "3", the numerical key 120 indicating "6", and the numerical key 120 indicating "9" are not operated. Thus, it is possible to prevent erroneous activation of the touch sensors 88 which would be otherwise caused when the mobile phone 70 is brought near to the antenna portion 80. It is noted that the second threshold is also increased up to 70.

Figure 18:
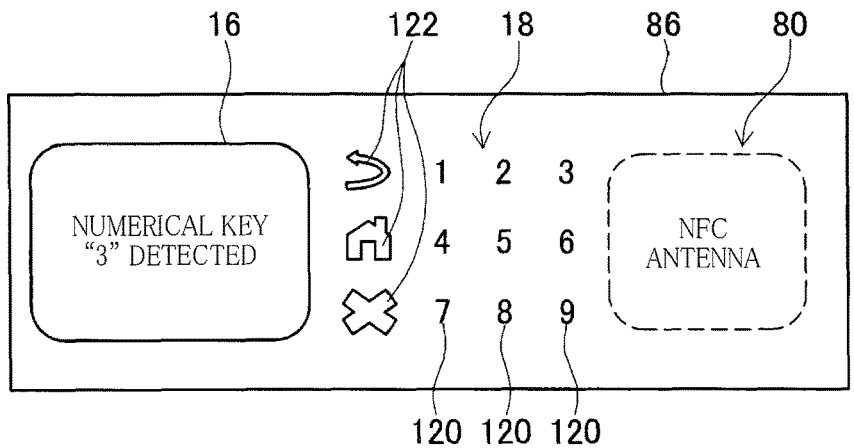
FIG. 18 is a plan view showing the panel 16, the button input portion 18, and the antenna portion 80 of the NFC I/F 28 in the MFP 10 according to the third embodiment of the invention and a table that indicates detection values by the touch sensors of numerical keys, amplification coefficients, sensor values, and thresholds.

Even where the thresholds are increased, it is possible to suitably detect user's operations on the numerical keys 120. For instance, when the user brings the input tool 100 such as his/her finger or the like near to the numerical key 120 indicating "3" for operating the numerical key 120 indicating "3", the detection value (=10) is detected by the touch sensor 88 of the numerical key 120 indicating "3", as shown in the table of FIG. 18. Further, when the input tool 100 approaches the numerical key 120 indicating "3", the input tool 100 also approaches the numerical key 120 indicating "6". As a result, the detection value (=3) is detected by the touch sensor 88 of the numerical key 120 indicating "6".

By multiplying the detection value of each touch sensor 88 by the amplification coefficient (=10), the sensor value is calculated, and it is judged whether the sensor value of each touch sensor 88 is larger than the first threshold (=80). The sensor value of the touch sensor 88 of the numerical key 120 indicating "3" is 100 and is accordingly larger than the first threshold (=80). On the other hand, the sensor value of the touch sensor 88 of the numerical key 120 indicating "6" is 30 and is accordingly not larger than the first threshold (=80). Therefore, the touch or the approach of the input tool 100 is detected by the touch sensor 88 of the numerical key 120 indicating "3", and it is judged that the numerical key 120 indicating "3" is operated.

By thus increasing the first threshold for detection of the touch or the approach of the input tool 100, the touch sensors 88 can be prevented from being erroneously activated and the input tool 100 can be appropriately detected by the touch sensors 88.

Figure 19:
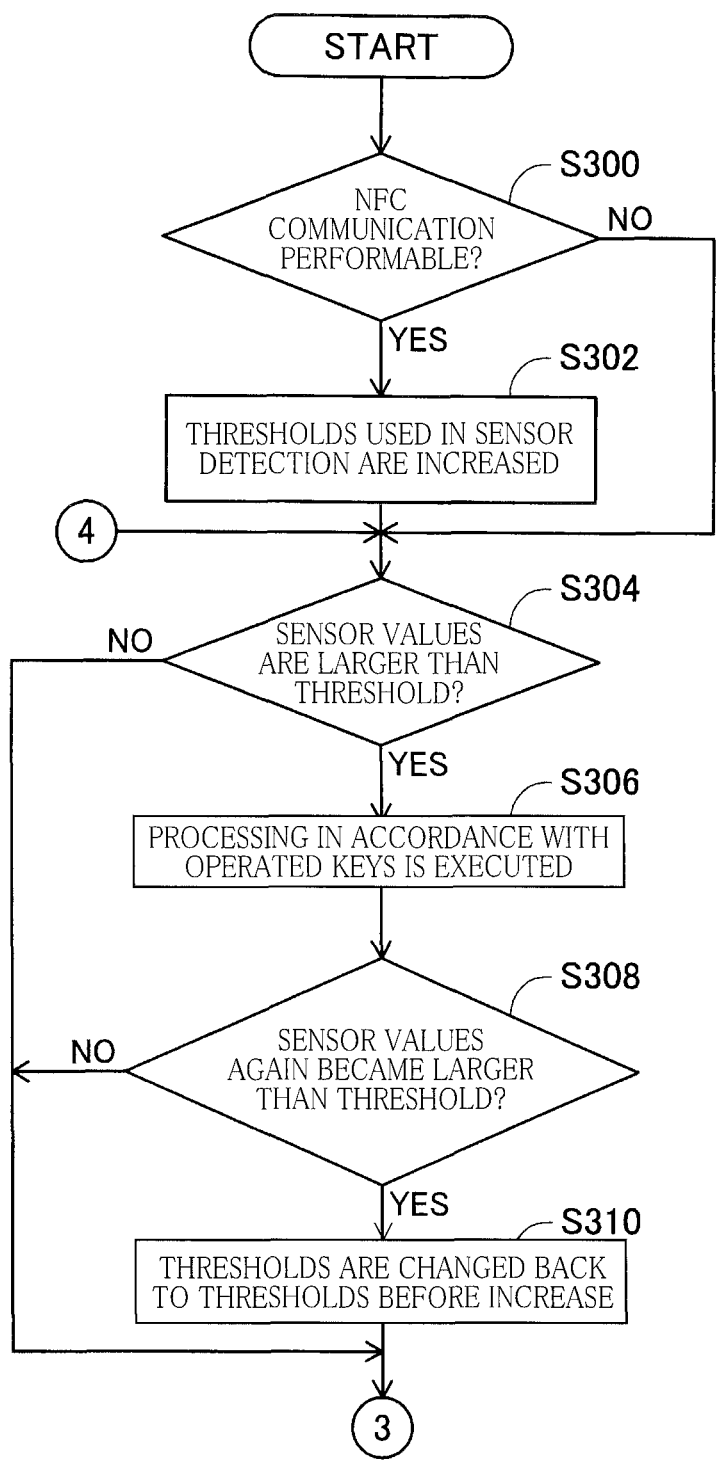
FIG. 19 is a flow chart showing processing in the MFP 10 according to the third embodiment of the invention.
Figure 20:
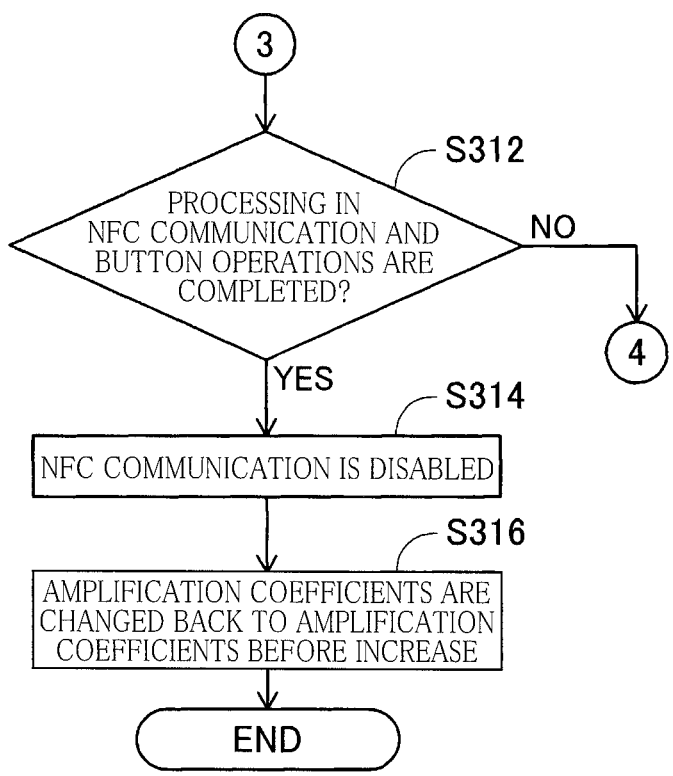
FIG. 20 is a flow chart showing processing in the MFP 10 according to the third embodiment of the invention.

With reference to FIGS. 19 and 20, there will be explained a flow for reducing the sensor detection areas in the MFP 10 according to the third embodiment. Because the flow of FIGS. 19 and 20 is substantially the same as the flow of FIGS. 12 and 13, the flow of FIGS. 19 and 20 will be briefly explained.

Initially, in S300, there is executed by the CPU 12 the same processing as the processing in S100 of FIG. 12. The control flow then proceeds to S302. In S302, the first threshold and the second threshold used in the touch sensors 88 of the numerical keys 120 are increased. It is noted that the increased thresholds are set in accordance with the distance of each of the numerical keys 120 and the antenna portion 80, like the amplification coefficients in the first embodiment.

Subsequently, in S304-S308, there is executed by the CPU 12 substantially the same processing as the processing in S104-S108 of FIG. 12. The control flow then proceeds to S310. In S310, the increased first threshold and second threshold are changed back to the first threshold and the second threshold before increase. Subsequently, in S312 and S314, there is executed by the CPU 12 substantially the same processing as the processing in S112 and S114 of FIG. 13. The control flow then proceeds to S316. In S316, the increased first threshold and second threshold are changed back to the first threshold and the second threshold before increase. Thus, the processing according to the flow ends.

Modified Example

It is to be understood that the present invention is not limited to the details of the embodiments illustrated above, but may be embodied with various changes and modifications, which may occur to those skilled in the art. In the illustrated embodiments, the amplification coefficients or the thresholds are changed into the preset amplification coefficients or thresholds. The amplification coefficients or the thresholds may be changed into respective values that are set on the basis of the sensor values of the touch sensors 88. More specifically, the sensor values in accordance with user's operations, the sensor values detected when the mobile phone 70 is brought near to the antenna portion 80, and so on may be stored in the CPU 12. On the basis of the stored sensor values, there may be set, in the CPU 12, optimum amplification coefficients or thresholds that prevent erroneous activation of the touch sensors 88 and that obviate deterioration in operability.

In the third embodiment, the two thresholds, i.e., the first threshold and the second threshold, are employed, and the sensor detection areas are reduced by increasing the two thresholds. Only one threshold may be employed, and the sensor detection areas may be reduced by increasing the one threshold. Further, also in the third embodiment, the sensor detection areas may remain reduced even when the operation keys 120, 122 are successively operated in a situation in which the sensor detection areas are reduced, as in the second embodiment. In other words, even when the operation keys 120, 122 are successively operated in the situation in which the sensor detection areas are reduced, the state in which the thresholds are increased may be kept.

In the illustrated embodiments, the MFP 10 is employed as the communication device configured to perform the NFC communication with the mobile phone 70. As the communication device, there may be employed various devices such as printers and personal computers (PC).

In the illustrated embodiments, the mobile phone 70 is employed as the information processing terminal configured to perform the wireless communication 60 with the MFP 10. As the information processing terminal, tablet devices, smartphones, and so on may be employed.

In the illustrated embodiments, the wireless communication according to NFC is employed as the near field communication. It is possible to employ wireless communication according to Transfer Jet or the like.

In the illustrated embodiments, the processing shown in FIGS. 12-13, FIG. 14, and FIGS. 19 and 20 is executed by the CPU 12. The processing may be executed by an ASIC and other logic integrated circuits. The CPU 12, the ASIC, and other logic integrated circuits may cooperate with one another to execute the processing.

ADVANTAGES

According to the communication device constructed as described above, the distance within which the touch or the approach of the input tool (input object) is detectable by the touch sensor is shorter than the distance within which the near field communication by the near field communicator with the information processing terminal is possible. Accordingly, it is possible to establish the near field communication before the information processing terminal or fingers of a user or the like holding the information processing terminal enters a sensor detection area in which the touch or the approach of the input tool is detectable by the touch sensor. Further, it is possible to establish the near field communication before a radio wave used in the near field communication enters the sensor detection area. That is, it is possible to prevent the input tool such as the information processing terminal or the radio wave used in the near field communication from entering the sensor detection area, thereby preventing the touch sensor from being erroneously activated.

According to the communication device constructed as described above, the distance between: the position that is the most distant from the touch sensor in the sensor detection area in which the touch or the approach of the input tool is detectable by the touch sensor; and the sensor top cover is shorter than the distance between: the position that is the most distant from the near field communicator in the communication area; and the communication top cover. Accordingly, although the touch sensor needs to be operated near the sensor top cover, the near field communication can be performed with the information processing terminal located distant from the communicator top cover. That is, even if the information processing terminal is somewhat spaced apart from the communication top cover, the near field communication can be performed, thereby preventing the information processing terminal from approaching the touch sensor. Accordingly, the touch sensor can be prevented from being erroneously activated.

In the communication device constructed as described above, the sensor detection area in which the touch or the approach of the input tool is detectable by the touch sensor is reduced in a state in which the near field communication by the near field communicator with the information processing terminal is performable. In the arrangement, even where the information processing terminal is brought near to the touch sensor, it is possible to prevent the touch sensor from being erroneously activated.

The communication device constructed as described above is configured such that, where the touch sensor detects the change in capacitance, the touch sensor amplifies a detected value of the change in capacitance by a predetermined amplification coefficient so as to obtain an amplified value and the touch sensor detects the touch or the approach of the input tool on condition that the amplified value has exceeded a set threshold. In the thus configured communication device, the sensor detection area is reduced by decreasing the predetermined amplification coefficient in the first embodiment or by increasing the threshold in the third embodiment, whereby the sensor detection area can be appropriately reduced.

In the communication device having a plurality of touch sensors, the sensor detection area of each of only some of the plurality of touch sensors that are disposed near the near field communicator is reduced in a state in which the near field communication by the near field communicator with the information processing terminal is performable. In the arrangement, the touch sensors other than the touch sensors whose sensor detection areas are reduced can be operated as usual.

In the communication device having a plurality of touch sensors, the sensor detection area of each of the plurality of touch sensors is reduced such that a reduction ratio of the sensor detection area of each of the plurality of touch sensors that is nearer to the near field communicator is larger than that of each of the plurality of touch sensors that is distant from the near field communicator. In the arrangement, the sensor detection area of each of the touch sensors that will be erroneously activated with a high probability can be reduced, thereby effectively preventing erroneous activation of the touch sensors.

In the communication device according to the first and third embodiments, the sensor detection area is restricted from being reduced when the touch sensor is operated a plurality of times within a predetermined time period, even in a state in which the near field communication by the near field communicator with the information processing terminal is performable. In other words, when the user performs an input operation using the touch sensor, the sensor detection area before it is reduced can be maintained. Accordingly, it is possible to appropriately perform the input operation using the touch sensor while taking the user's intention taken into account.

In the communication device constructed as described above, the distance between the antenna portion and the communicator top cover is shorter than the distance between the base body and the sensor top cover. That is, the antenna portion is disposed so as to be located nearer to the top cover than the base body, enabling the antenna portion to easily transmit and receive the radio wave used in the near field communication. Accordingly, it is not necessary to employ a large-sized antenna portion, ensuring space savings.

In the communication device constructed as described above, the sensor top cover and the communicator top cover are disposed on one surface of a body of the communication device. In this instance, the near field communicator and the touch sensor are likely to be disposed so as to be adjacent to each other. Accordingly, the advantage of reducing the sensor detection area can be sufficiently enjoyed.

In the communication device constructed as described above, the sensor top cover and the communicator top cover are formed so as to be flush with each other. The arrangement eliminates a level difference between the surface of the touch sensor and the surface of the near field communicator, enhancing operability.

In the communication device constructed as described above, the sensor top cover and the communicator top cover are formed of one transparent plate member. The arrangement ensures a reduced number of required components of the communication device.

What is claimed is:

1. A communication device, comprising:
a touch sensor configured to detect a touch or an approach of an input object by detecting a change in capacitance;
a near field communicator configured to perform near field communication with an information processing terminal present in a communication area in which near field communication is possible, the information processing terminal being capable of performing the near field communication; and
a controller configured to control the communication device in accordance with detection of the touch or the approach of the input object by the touch sensor,
wherein the touch sensor has a base body covered with a sensor top cover,
wherein the near field communicator has an antenna portion covered with a communicator top cover,
wherein a distance between: a position that is the most distant from the touch sensor in a sensor detection area in which the touch or the approach of the input object is detectable by the touch sensor; and the sensor top cover is shorter than a distance between: a position that is the most distant from the near field communicator in the communication area; and the communication top cover,
wherein when the near field communication is enabled, the controller reduces the sensor detection area, and
wherein when the near field communication is not enabled, the controller does not reduce the sensor detection area.

2. The communication device according to claim 1,
wherein, where the touch sensor detects the change in capacitance, the touch sensor amplifies a detected value of the change in capacitance by a predetermined amplification coefficient so as to obtain an amplified value, and the touch sensor detects the touch or the approach of the input object on condition that the amplified value has exceeded a set threshold, and
wherein the controller is configured to reduce the sensor detection area by decreasing the predetermined amplification coefficient.

3. The communication device according to claim 1,
wherein, where the touch sensor detects the change in capacitance, the touch sensor amplifies a detected value of the change in capacitance by a predetermined amplification coefficient so as to obtain an amplified value, and the touch sensor detects the touch or the approach of the input object on condition that the amplified value has exceeded a set threshold, and
wherein the controller is configured to reduce the sensor detection area by increasing the threshold.

4. The communication device according to claim 1, comprising a plurality of touch sensors each as the touch sensor,
wherein the controller is configured to reduce the sensor detection area of each of only some of the plurality of touch sensors that are disposed near the near field communicator.

5. The communication device according to claim 1, comprising a plurality of touch sensors each as the touch sensor,
wherein the controller is configured to reduce the sensor detection areas of each of the plurality of touch sensors such that a reduction ratio of the sensor detection area of each of the plurality of touch sensors that is nearer to the near field communicator is larger than that of each of the plurality of touch sensors that is distant from the near field communicator.

6. The communication device according to claim 1, wherein the controller is configured to restrict reduction of the sensor detection area when the touch sensor is operated a plurality of times within a predetermined time period, even in a state in which the near field communication by the near field communicator with the information processing terminal is performable.

7. The communication device according to claim 1, wherein a distance between the antenna portion and the communicator top cover is shorter than a distance between the base body and the sensor top cover.

8. The communication device according to claim 1, wherein the sensor top cover and the communicator top cover are disposed on one surface of a body of the communication device.

9. The communication device according to claim 8, wherein the sensor top cover and the communicator top cover are formed so as to be flush with each other.

10. The communication device according to claim 8, wherein the sensor top cover and the communicator top cover are formed of one transparent plate member.

11. A non-transitory computer-readable storage medium storing program instructions to be executed by a computer of a communication device, the communication device comprising: a touch sensor having a base body covered with a sensor top cover and configured to detect a touch or an approach of an input object by detecting a change in capacitance; and a near field communicator having an antenna portion covered with a communicator top cover and configured to perform near field communication with an information processing terminal present in a communication area in which near field communication is possible, the information processing terminal being capable of performing the near field communication, the communication device being configured such that a distance between: a position that is the most distant from the touch sensor in a sensor detection area in which the touch or the approach of the input object is detectable by the touch sensor; and the sensor top cover is shorter than a distance between: a position that is the most distant from the near field communicator in the communication area; and the communication top cover,
wherein the program instructions, when executed by the computer, cause the communication device to:
detect the touch or the approach of the input object via the touch sensor and reduce a size of the sensor detection area when the near field communication is enabled; and
detect the touch or the approach of the input object via the touch sensor and not reduce the size of the sensor detection area when the near field communication is not enabled.

* * * * *